United States Patent
Cockerill et al.

(10) Patent No.: US 9,964,024 B2
(45) Date of Patent: May 8, 2018

(54) CHARGE AIR COOLER CONTROL SYSTEM AND METHOD

(71) Applicant: Ford Global Technologies, LLC, Dearborn, MI (US)

(72) Inventors: Charles A. Cockerill, Brighton, MI (US); Shuya Shark Yamada, Novi, MI (US); Chris Paul Glugla, Macomb, MI (US); Phil Andrew Fabien, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1035 days.

(21) Appl. No.: 14/259,086

(22) Filed: Apr. 22, 2014

(65) Prior Publication Data

US 2014/0224226 A1 Aug. 14, 2014

Related U.S. Application Data

(62) Division of application No. 13/567,979, filed on Aug. 6, 2012, now Pat. No. 8,726,889.

(60) Provisional application No. 61/621,928, filed on Apr. 9, 2012.

(51) Int. Cl.
| | |
|---|---|
| *F02M 15/00* | (2006.01) |
| *F02B 29/04* | (2006.01) |
| *F28F 27/02* | (2006.01) |
| *F28D 1/04* | (2006.01) |
| *F28D 1/053* | (2006.01) |
| *F02M 26/05* | (2016.01) |
| *F02M 26/06* | (2016.01) |
| *F02M 26/22* | (2016.01) |

(52) U.S. Cl.
CPC .......... *F02B 29/04* (2013.01); *F02B 29/0418* (2013.01); *F28D 1/0417* (2013.01); *F28D 1/05366* (2013.01); *F28F 27/02* (2013.01); *F02M 26/05* (2016.02); *F02M 26/06* (2016.02); *F02M 26/22* (2016.02); *Y02T 10/146* (2013.01)

(58) Field of Classification Search
CPC . F02M 31/20; F02B 29/0456; F02B 29/0418; F02B 29/0493
USPC .............. 123/542, 540, 563, 198 D; 60/599; 165/100–103, 158, 159, 174, 114, 99, 165/231, 280, 283, 287, 297, 164–167
See application file for complete search history.

(56) References Cited

U.S. PATENT DOCUMENTS

| | | | |
|---|---|---|---|
| 4,593,749 | A | 6/1986 | Schatz |
| 5,152,144 | A | 10/1992 | Andrie |
| 5,632,256 | A | 5/1997 | Eibl |
| 7,257,950 | B2 | 8/2007 | Iwaszkiewicz |
| 7,621,128 | B2 | 11/2009 | Czarnowski et al. |

(Continued)

FOREIGN PATENT DOCUMENTS

| | | |
|---|---|---|
| EP | 1923551 A2 | 11/2007 |
| EP | 2161430 A1 | 3/2010 |

(Continued)

*Primary Examiner* — Hung Q Nguyen
(74) *Attorney, Agent, or Firm* — Julia Voutyras; McCoy Russell LLP

(57) ABSTRACT

A charge air cooler arrangement, a charge air cooler tank, and method are disclosed. The charge air cooler arrangement includes a charge air cooler having an operable thermal transfer area configured to transfer heat from inside the charge air cooler to outside of the charge air cooler. The charge air cooler arrangement may also include a valve configured to change the operable thermal transfer area from a relatively large area to a relatively small area.

15 Claims, 8 Drawing Sheets

(56) References Cited

U.S. PATENT DOCUMENTS

| | | | |
|---|---|---|---|
| 7,828,044 | B2 | 11/2010 | Hagberg et al. |
| 8,191,366 | B2 | 6/2012 | Taylor |
| 2005/0039729 | A1 | 2/2005 | Rosin et al. |
| 2005/0081523 | A1 | 4/2005 | Breitling et al. |
| 2005/0269062 | A1 | 12/2005 | Guerrero et al. |
| 2008/0302327 | A1 | 12/2008 | Dahl et al. |
| 2010/0050997 | A1 | 3/2010 | Huber et al. |
| 2014/0047833 | A1 | 2/2014 | Buckland et al. |
| 2014/0048048 | A1 | 2/2014 | Glugla et al. |
| 2014/0048049 | A1 | 2/2014 | Glugla et al. |

FOREIGN PATENT DOCUMENTS

| | | |
|---|---|---|
| JP | S59145325 A | 8/1984 |
| JP | S6050225 A | 3/1985 |
| JP | S61237998 A | 10/1986 |
| JP | S6246194 A | 2/1987 |

_US 9,964,024 B2_

CHARGE AIR COOLER CONTROL SYSTEM AND METHOD

CROSS REFERENCE TO RELATED APPLICATIONS

The present application is a divisional of U.S. patent application Ser. No. 13/567,979, "CHARGE AIR COOLER CONTROL SYSTEM AND METHOD," filed on Aug. 6, 2012, which claims priority to U.S. Provisional Patent Application No. 61/621,928, "CHARGE AIR COOLER CONTROL SYSTEM AND METHOD," filed on Apr. 9, 2012, the entire contents of each of which are hereby incorporated by reference for all purposes.

FIELD

The present application relates to methods and systems for cooling engine charge air after being compressed by a compressor, and including methods and systems wherein the operative heat transfer area of the charge air cooler is modifiable during engine and vehicle operation with a valve arrangement.

BACKGROUND AND SUMMARY

Many internal combustion engines include turbochargers, or superchargers configured to force more air mass into an engine's intake manifold and combustion chamber by compressing intake air with a compressor driven by a turbine disposed to capture energy from the flow of the engine exhaust gas. However, compression tends to heat the intake air, leading to a reduction of the density of the charge air. It is known to use a charge air cooler to compensate for heating caused by supercharging.

In order to achieve high Charge Air Cooler (CAC) efficiency in boosted applications and under hot ambient operating conditions, charge air coolers should be large and receive "First Air", (e.g., be in front of a radiator and all other cooling devices). During operation in humid and cooler climates, the size of the CAC may be such that water vapor in the air will condense out and be stored in the CAC. When the flow of intake air reaches a high enough velocity, condensed water may be stripped out of the CAC and ingested into the engine. However, if too much water is ingested into the engine too rapidly, the engine may misfire. Such misfiring can be extreme. Conversely, air flow velocities during low air flow demand remain high and may not allow for condensation build up in the CAC.

Embodiments may provide a valve which may be actuated in boosted engine applications. The valve may be either mechanical or electrical, and in some examples may be located in the charge air cooler (CAC), the inlet tank, or the outlet tank to utilize the required volume of the CAC as needed for predetermined engine operating conditions.

Embodiments may utilize one or more valves configured to close off portions of the CAC during low engine air flow requirements and open the entire CAC during high engine air flow requirements. In this way, efficiency requirements may be better met during both low air flow operation and high air flow operation.

A charge air cooler arrangement, a charge air cooler tank, and method are disclosed. The charge air cooler arrangement includes a charge air cooler having an operable thermal transfer area configured to transfer heat from inside the charge air cooler to outside of the charge air cooler. The charge air cooler arrangement may also include a valve configured to change the operable thermal transfer area from a relatively large area to a relatively small area and back again. In this way the amount of thermal transfer area, and the volume of the CAC, may be adjusted according to engine operation. For example, during operating conditions more prone to condensate formation (e.g., lower flow engine operating conditions), the valve can be adjusted to reduce the number of open channels in the charge air cooler, thereby increasing air flow velocity. However, during operating conditions less prone to condensate formation (e.g., higher flow engine operating conditions, as compared to the lower air flow conditions), the valve can be adjusted to increase the number of open channels in the charge air cooler, thereby decreasing air flow resistance and increasing air flow cooling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-9 are drawn approximately to scale, although other relative dimensions and positioning may be used, if desired.

DETAILED DESCRIPTION

Figure 1:
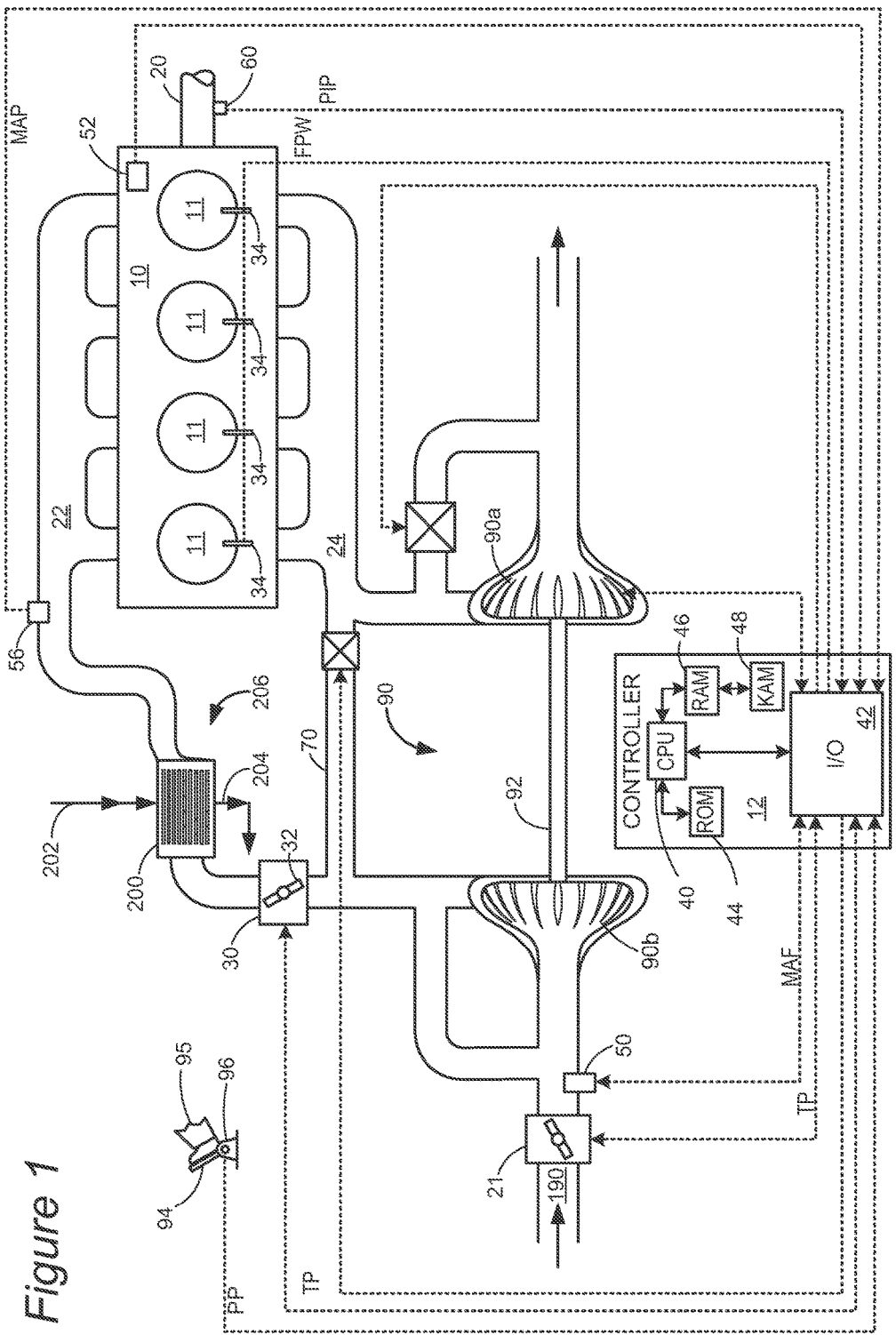
FIG. 1 shows an example vehicle system layout, including an air intake system and a charge air cooler arrangement in accordance with the present disclosure.

FIG. 1 shows an example of an engine system, for example, an engine system generally at 10. The engine system 10 may be a diesel engine, or a gasoline engine, or other type of engine that may utilize various components in accordance with the present disclosure. Specifically, internal combustion engine 10 comprises a plurality of cylinders 11. Engine 10 is controlled by electronic engine controller 12. Engine 10 includes a combustion chamber and cylinder walls with a piston positioned therein and connected to crankshaft 20. The combustion chamber communicates with an intake manifold 22 and an exhaust manifold 24 via respective intake and exhaust valves.

Intake manifold 22 communicates with throttle body 30 via throttle plate 32. In one embodiment, an electronically controlled throttle can be used. In some embodiments, the throttle is electronically controlled and adjustable to periodically, or continuously, maintain a specified vacuum level in intake manifold 22. While throttle body 30 is depicted as being downstream of a compressor device 90b, it will be appreciated that the throttle body may be placed upstream or downstream of the compressor. The choice may depend partly on the specific EGR system or systems that is/are used. Alternatively, or additionally, a throttle body may be placed in the exhaust line to raise exhaust pressure. This may be effective in helping to drive EGR, but may not be effective in reducing total mass flow through the engine.

The combustion chamber is also shown having fuel injectors 34 coupled thereto for delivering fuel in proportion to the pulse width of signal (fpw) from controller 12. Fuel is delivered to the fuel injectors 34 by a conventional fuel system (not shown) including a fuel tank, fuel pump, and fuel rail (not shown). In the case of direct injection engines, as shown in FIG. 1, a high pressure fuel system is used such as a common rail system. However, there are several other fuel systems that could be used as well, including but not limited to EUI, HEUI, etc.

In the depicted embodiment, controller 12 is a conventional microcomputer, and includes a microprocessor unit 40, input/output ports 42, electronic memory 44, which may be an electronically programmable memory in this particular example, random access memory 46, keep alive memory 48, and a conventional data bus.

Controller 12 may be configured to receive various signals from sensors coupled to engine 10, which may include but may not be limited to: measurements of inducted mass airflow (MAF) from mass airflow sensor 50; engine coolant temperature (ECT) from temperature sensor 52; manifold pressure (MAP) from manifold pressure sensor 56 coupled to intake manifold 22; a measurement of throttle position (TP) from a throttle position sensor (not shown) coupled to throttle plate 32; and a profile ignition pickup signal (PIP) from Hall effect sensor 60 coupled to crankshaft 20 indicating engine speed.

Engine 10 may include an exhaust gas recirculation (EGR) system to help lower NOx and other emissions. For example, engine 10 may include a high pressure EGR system in which exhaust gas is delivered to intake manifold 22 by a high pressure EGR passage 70 communicating with exhaust manifold 24 at a location upstream of an exhaust turbine 90a of a compression device 90, and communicating with intake manifold 22 at a location downstream of an intake compressor 90b of the compression device 90. A high pressure EGR valve assembly (not shown) may be located in high pressure EGR passage 70. Exhaust gas may then travel from exhaust manifold 24 first through high pressure EGR passage 70, and then to intake manifold 22. An EGR cooler (not shown) may be included in high pressure EGR tube 70 to cool re-circulated exhaust gases before entering the intake manifold. Cooling may be done using engine water, but an air-to-air heat exchanger may also be used. Alternatively or additionally, a low pressure EGR system may be included in engine 10.

Further, drive pedal 94 is shown along with a driver's foot 95. Pedal position sensor (pps) 96 measures the angular position of the driver actuated pedal. Further, engine 10 may also include exhaust air/fuel ratio sensors (not shown). For example, either a 2-state EGO sensor or a linear UEGO sensor can be used. Either of these may be placed in the exhaust manifold 24, or downstream of the compression device 90.

Compression device 90 may be a turbocharger or any other such device. The depicted compression device 90 may have a turbine 90a coupled with the exhaust manifold 24 and a compressor 90b coupled with the intake manifold 22 via an intercooler 200 which may be an air-to-air heat exchanger, but could be water cooled. Turbine 90a is typically coupled to compressor 90b via a drive shaft 92. A sequential turbocharger arrangement, single VGT, twin VGTs, or any other arrangement of turbochargers could be used and could include coolers within the compression device system, such as between two stages of compression.

As mentioned, intake passage 190 may include a charge air cooler 200 (CAC) (e.g., an intercooler) to decrease the temperature of the turbocharged or supercharged intake gases. A flow of coolant shown by an incoming flow 202 and an outgoing flow 204 is shown with arrows; e.g., the charge air cooler 200 may include a coolant inlet 202 configured to receive coolant and a coolant outlet 204 configured to expel coolant. The source of the incoming flow 202 and the destination of the outgoing flow 204 have been omitted from the figure. The coolant fluid that flows as incoming flow 202 and outgoing flow 204 may be air or another fluid such as water, an appropriate chemical coolant, or a mixture thereof. In one case the charge air cooler 200 may be referred to as water cooled and in another it may be referred to as air cooled. The coolant in the charge air cooler 200 may be circulated in a coolant passage 206. It will be appreciated that the coolant passage 206 may have geometric features configured to aid thermal transfer between the intake passage 190 and the coolant passage 206. In this way, heat may be drawn away from the intake passage 190 via the charge air cooler 200. Thus, the temperature of the intake air delivered to a combustion chamber may be reduced, increasing the air pressure and increasing combustion efficiency.

Embodiments in accordance with the present disclosure may provide two or more thermal transfer configurations using a single charge air cooler 200 such that a first amount of thermal transfer is possible with a first configuration, and a second amount of thermal transfer is possible with a second configuration. In this way engine efficiency requirements may be better met during more than one intake air flow demand operation. In addition, or alternatively, excess condensate build up may be avoided. Example details are illustrated in FIG. 1 and also in the following figures. Some variations are also illustrated.

Figure 2:
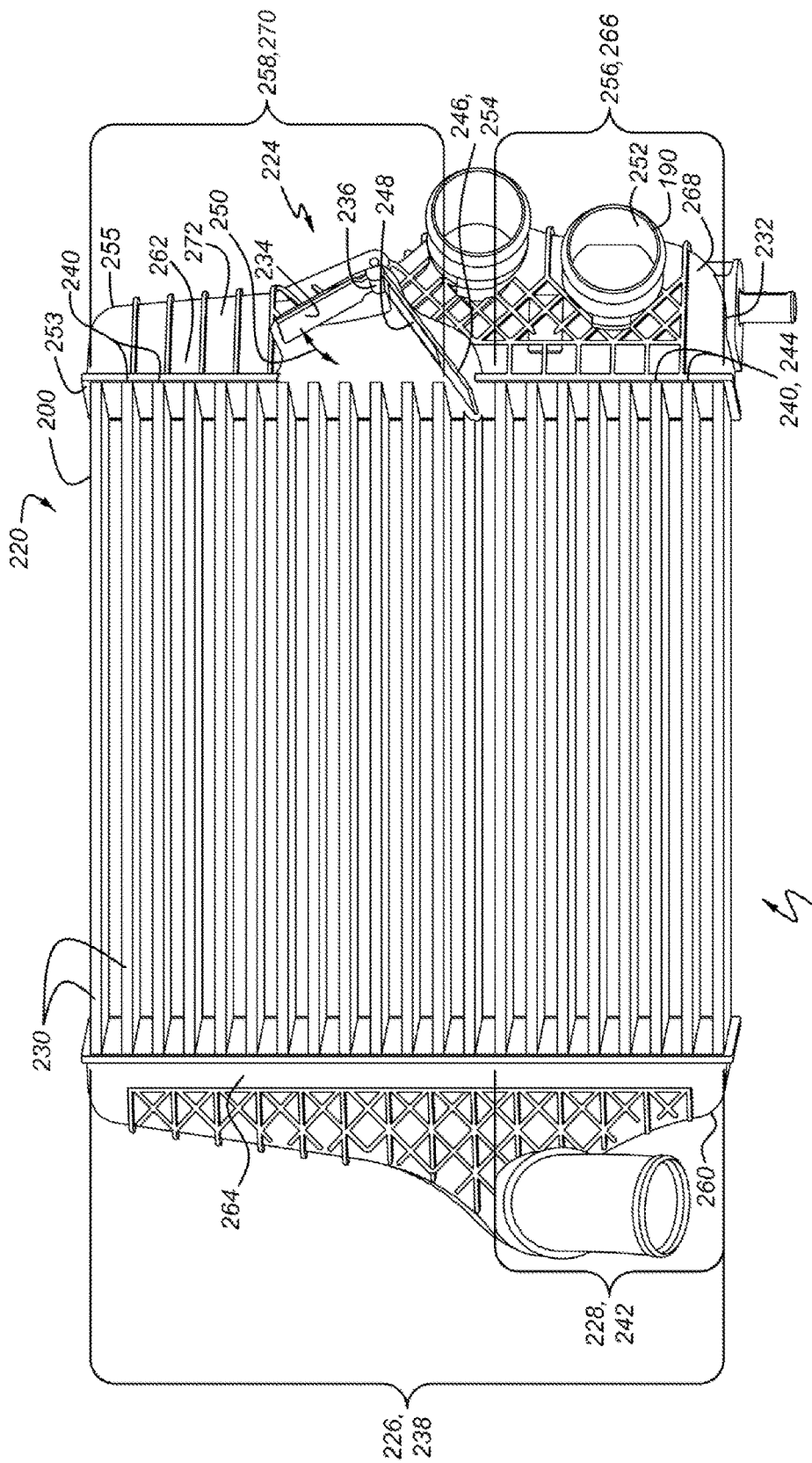
FIG. 2 is a front perspective view of a charge air cooler arrangement with a cutout portion to show some inner details thereof.

FIG. 2 is a front perspective view of a charge air cooler arrangement 220 in accordance with one example embodiment with a cutout portion to show some inner details thereof. The charge air cooler arrangement 220 may include a charge air cooler 200 having an operable thermal transfer area 222 configured to transfer heat from inside the charge air cooler 200 to outside of the charge air cooler 200. The charge air cooler arrangement 220 may also include a valve 224 configured to change the operable thermal transfer area from a relatively large area 226 to a relatively small area 228.

The charge air cooler arrangement 220 may also include a plurality of cooling tubes 230 located in the charge air cooler 200. Substantially all of the plurality of cooling tubes may define the relatively large area 226. A portion of the plurality of cooling tubes 230 may define the relatively small area 228. An inlet tank 232 may be located between an intake passage 190 (e.g., FIG. 1) and the charge air cooler 200 providing fluidic access of intake air to the plurality of cooling tubes 230. The valve 224 may be located in the inlet tank 232.

Various embodiments may include a charge air cooler 200 with various numbers of cooling tubes, and the number of cooling tubes for the relatively small area 228 may also vary. In one example, substantially all of the plurality of cooling tubes may comprise twenty-one tubes, and the portion of the plurality of cooling tubes, which may comprise the relatively small area 228, may number nine tubes.

The charge air cooler inlet tank 232 may be sealed for fluidic communication with an inlet side of the charge air cooler 200. A plate 234 may be disposed in the charge air cooler inlet tank 232 for hinge-able movement via hinge 236 therein to selectively change the operable thermal transfer area from one to the other of the relatively large area 226 and the relatively small area 228. The plate 234 may be pivotally coupled with the charge air cooler inlet tank 232 for selectively obstructing flow into a portion of the charge air cooler to change the operable thermal transfer area 222 to the relatively small area 228. The relatively small area 228 may be an area in a first set of tubes 238 accessible from a first set of tube openings 240; and wherein the relatively large area 226 may be a combination of the area in the first set of tubes 238 and an area in a second set of tubes 242 accessible from a respective second set of tube openings 244.

The valve 224 may be, or may be similar to, a flapper valve. The valve 224 may include a seat member 246 comprising a substantially flat stationary member having one or more holes 248 there through. A closure member 234, for example a flap or plate, may be configured to move as illustrated by arrow 250 from a first position spaced from the seat member 246 thereby opening the one or more holes 248 wherein intake air is able to flow into the relatively large area 226, to a second position adjacent to the seat member 246 thereby closing the one or more holes 248 wherein intake air is able to flow into only the relatively small area 228.

The inlet tank 232 may be coupled to an inlet side 252 of the charge air cooler 200. A divider 254 may separate the inlet tank 232 into two portions, a first portion 256, and a second portion 258. The valve 224 may be located at the divider 254 and may be configured to open to allow a flow of intake air into the relatively large area 226 and may be configured to close to allow the flow of intake air into only the relatively small area 228. The divider 254 may be part of the valve 224. For example, the divider 254 may be a valve seat. The divider 254 may also be a dividing line or datum, or the like, functionally dividing the charge air cooler 200 into the two portions. Some embodiments may include two or more dividers dividing the inlet into three or more portions. In some examples one or more configurations described herein regarding an inlet tank 232 may instead, or in addition, be included in an outlet tank 260 shown in FIG. 2. The charge air cooler 200 may include a plurality of tubes 230 extending from an inlet side 252 to an outlet side 264, substantially all of the plurality of tubes may be in mutual fluidic communication at the outlet side 264.

The divider 254 may divide the inlet side 252 of the plurality of tubes 230 into a first set of tubes 266 in mutual fluidic communication on a first side 268 of the divider, and a second set of tubes 270 in mutual fluidic communication on a second side 272 of the divider 254. There may be a hole 248 in the divider 254 to allow the intake air to pass through the divider 254. A flap 234 may be configured to move away from the hole 248 to allow the intake air to pass through the hole 248 and, conversely, to move toward sealing engagement with the hole to prevent the intake air from passing through the hole 248.

It will be understood that instead all the tubes may be in fluid communication on the inlet side and divided at the outlet side into two or more portions of tubes. A similarly configured flap may also be included in the outlet tank and function to control whether the fluid is allowed to pass or is prevented from passing through a similarly configured hole.

Figure 3A:
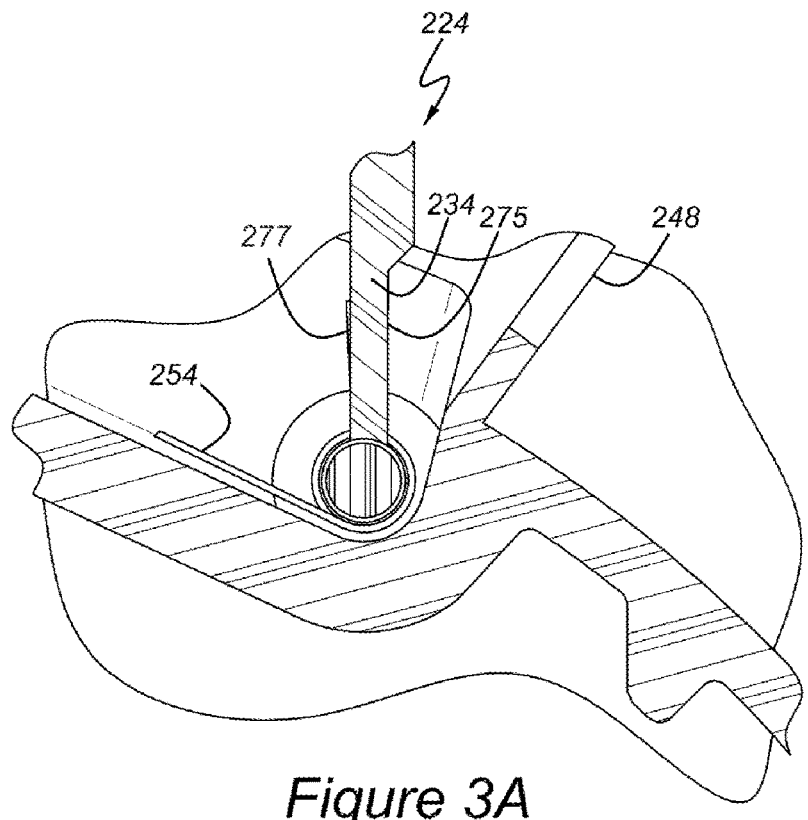
FIGS. 3A and 3B are cross sectional views illustrating a valve in accordance with various embodiments showing respectively an open position and a closed position.
Figure 3B:
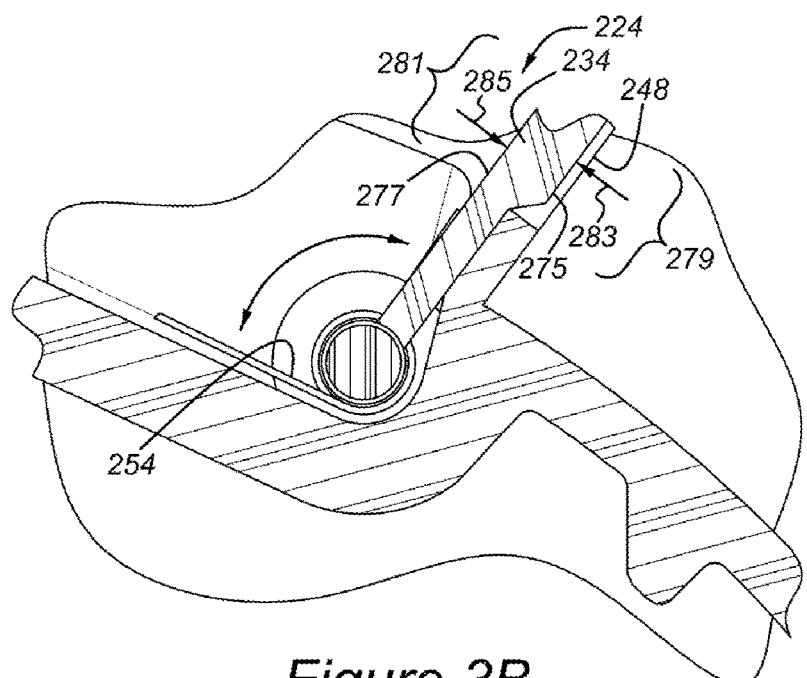

FIGS. 3A and 3B are cross sectional views illustrating the valve 224 in an open position (FIG. 3A) and a closed position (FIG. 3B). The flap 234 may have a first side 275 and a second side 277. When the flap 234 is in sealing engagement with the hole 248, a first area 279 on the first side 275 may be exposed to a first pressure, and a second area 281 on the second side 277 may be exposed to a second pressure. A second resultant force 285 on the on the second side 277 (as may be determined by a product of the second pressure and the second area) as compared to a first resultant force 283 on the first side 275 (as may be determined by a product of the first pressure and the first area) tends to keep the flap 234 toward sealing engagement. Specifically after the inlet air passes through the charge air cooler, e.g., when passing through the first set of tubes 238 with the flap closed, the inlet air will drop in pressure. The second pressure may be a static pressure resulting substantially from a fluidic communication between the outlet side of the charge air cooler with the second side of the flap via the second set of tubes. The first pressure may result substantially from inlet air pressure. The tubes open on the inlet side 252 above the closed flap and open on the outlet side 264 to the outlet tank 260 may then essentially function as a continuous volume able to communicate a lower static pressure.

Various embodiments may include an actuator (not illustrated) to open and close the flap 234. The actuator may be one or more of: an electronic actuator, a vacuum controlled actuator, a mechanical pressure diaphragm, and a pulse-width modulated electronic control. When the inlet air is allowed to pass through all the tubes of the charge air cooler, e.g. when the flap is open, the inlet air will also experience a drop in pressure and the flap will be exposed on both sides to the pressure of the incoming inlet air. In this way, the actuator may only need to provide a motive force to open and to close the flap in order to change the flap from an open state to a closed state, but may not need to provide force to keep the flap open or to keep the flap closed. Such operation is particularly advantageous in a vehicle application where the engine provides electrical power to the vehicle, in that it can reduce power consumption and thus increase overall vehicle fuel efficiency.

Figure 4:
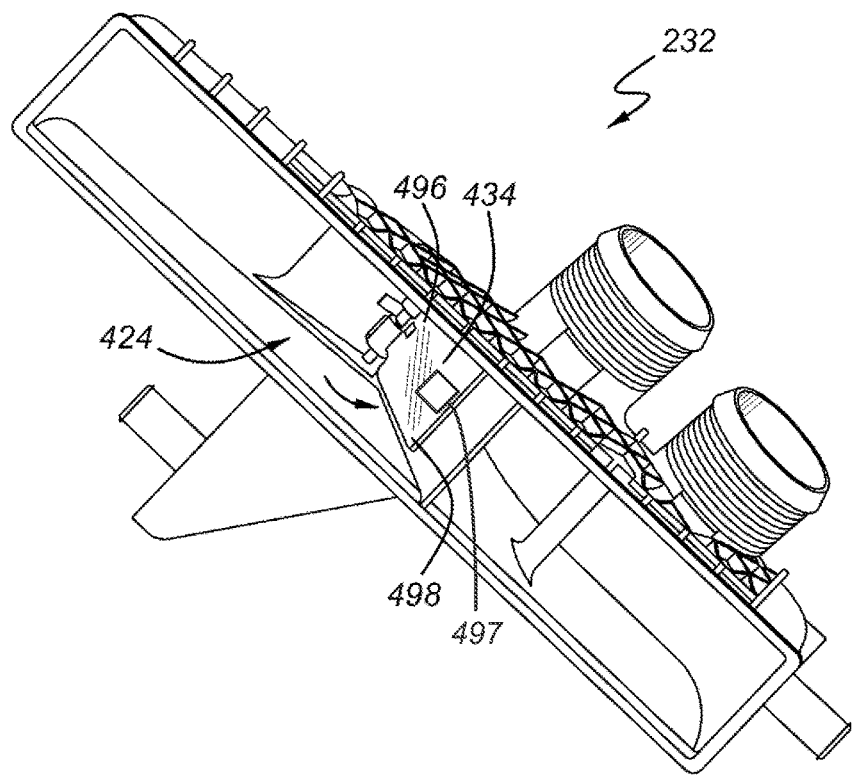
FIG. 4 is a perspective view of a charge air cooler tank in accordance with various embodiments.
Figure 5:
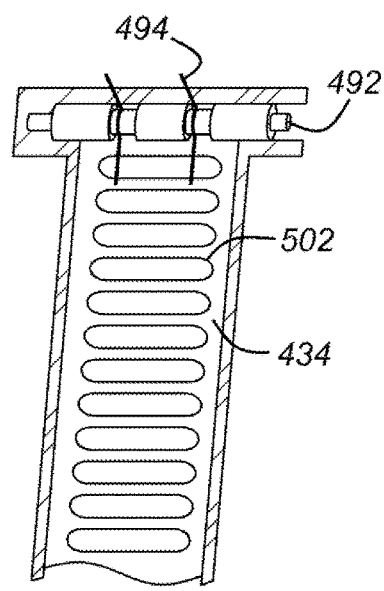
FIG. 5 is a side view of an example flap which may be included in a charge air cooler tank such as the charge air cooler tank illustrated in FIG. 4.
Figure 6:
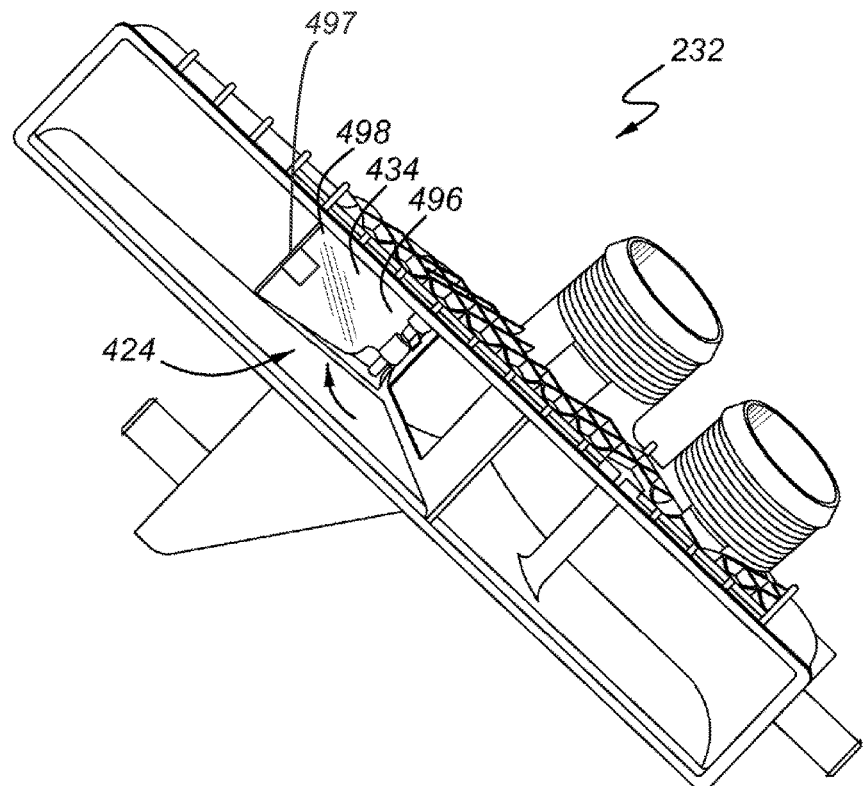
FIG. 6 is a perspective view of the example charge air cooler tank of FIG. 4 shown in a different state.
Figure 7:
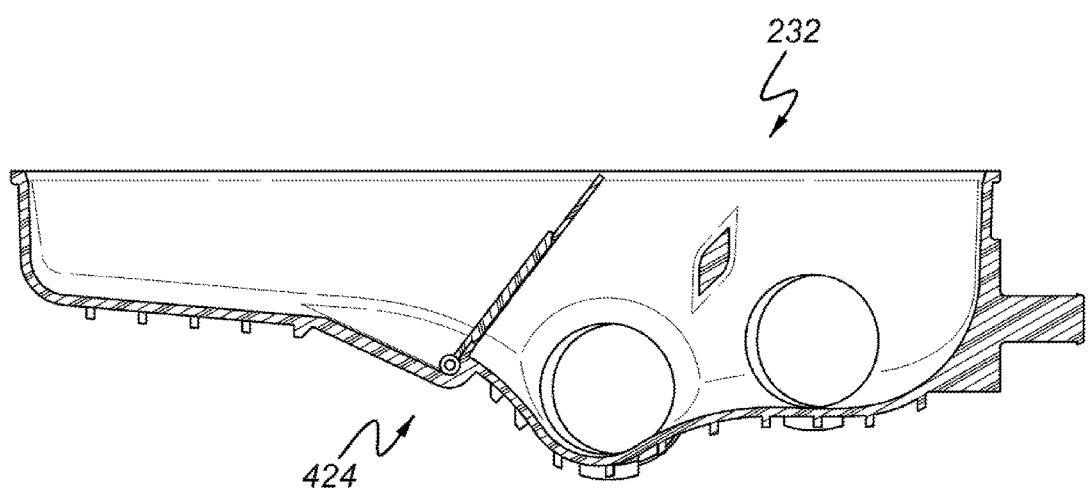
FIG. 7 is another side view of an example charge air cooler tank in accordance with various embodiments.
Figure 8:
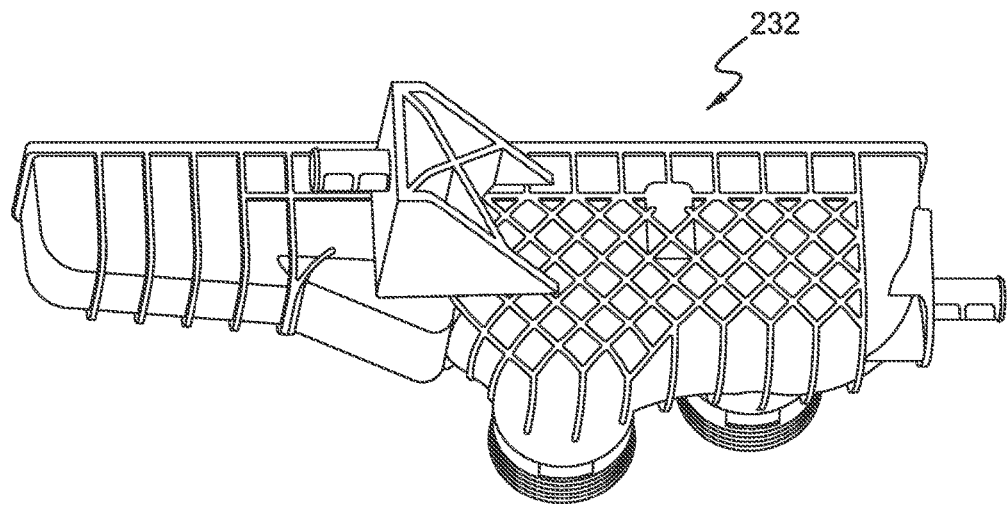
FIG. 8 is a perspective back view of an example charge air cooler tank in accordance with various embodiments.
Figure 9:
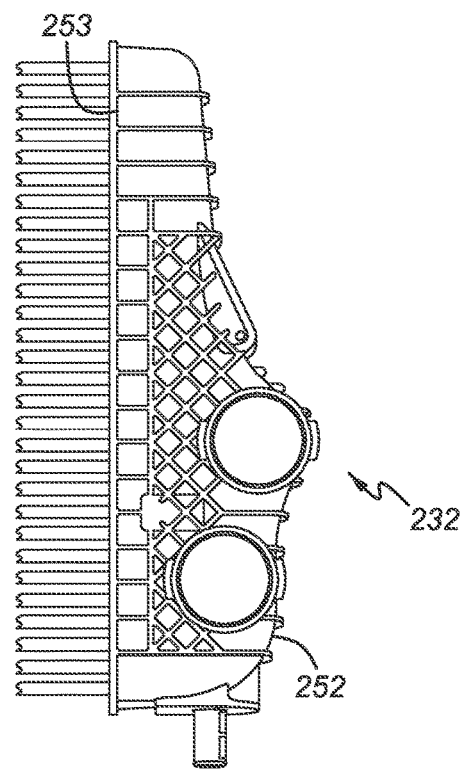
FIG. 9 is a front view of an example charge air cooler tank in accordance with various embodiments.

FIGS. 4 and 6-9 illustrate various examples of a charge air cooler tank, for example an inlet tank 232, or an outlet tank. FIG. 4 shows an exemplary charge air cooler tank with a valving element 424 in a closed state, while FIG. 6 shows the exemplary charge air cooler tank of FIG. 4 with the valving element 424 in an open state. FIGS. 7-9 illustrate additional views of exemplary charge air cooler tanks FIG. 5 is a side view of an example flap 234 which may be included in an inlet tank and/or outlet tank. The inlet and outlet tanks (e.g., 232, 260 in FIG. 2) may be sealed for fluidic communication with a side of the charge air cooler, and the valve may include a plate hinge-ably positioned at a junction between the charge air cooler tank and the side of the charge air cooler.

Referring also to FIG. 5, the plate 434 may be pivotally coupled with the inlet tank with a shaft 492, and may further comprise one or more torsional springs 494 coupled with the shaft 492 for biasing the plate 434 toward the charge air cooler. FIG. 4 illustrates a different example wherein the plate 434 may be pivotally coupled with the inlet tank 232 at a proximal end 496, and further comprising a bias 497 at a distal end 498 of the plate configured to bias movement of the plate 434. In some cases the plate, or flap, may be biased at both ends, biased in a different fashion, or may not be biased at all. In some cases an actuator with a motive force may bias the plate.

Returning to FIG. 2, various embodiments may provide charge air cooler tanks 232, 260 that may include a first side being fluidically coupled to a fluid line 190 (e.g., FIG. 1); a second side being fluidically coupled to a charge air cooler; and a valving element 224. The valving element may have a first position configured to allow a fluid to pass through a first portion of the charge air cooler; and a second position configured to allow the fluid to pass through a second portion of the charge air cooler wherein the first portion is larger than the second portion.

The fluid may be intake air. The valve 224 (or, for example 424 in FIG. 4) may include a divider 254 fixed inside the charge air cooler tanks 232, 260 dividing the charge air cooler tanks 232, 260 into a first portion 256 and a second portion 258. A fluid line 190 (e.g., FIG. 1) may be configured to pass the intake air into the first portion 256. There may be a hole 248 in the divider 254. A flap 234 may be hinge-ably connected with the divider 254. The valve 224 may have a first position wherein a majority of the flap is not in contact with the divider such that the hole 248 is open. The valve 224 may have a second position wherein a majority of the flap is in contact with the divider such that the hole is closed.

Moving to FIGS. 3A and 3B, the hole 248 may be sized to expose a first area 279 of a first side 275 of the flap such that a mathematical product of the first area 279 and a first fluid pressure exerted on the first area when hole is closed by the flap may yield an opening force 283 on the flap 234. A second side of the flap 277 may have a second area 281 such that a mathematical product of the second area 281 and a second fluid pressure exerted on the second area yields a closing force on the flap, wherein the closing force 285 may be greater than the opening force 283. An actuator may be configured to move the flap from the first position to the second position.

The first portion of the charge air cooler tank may be essentially a whole of the charge air cooler, and the second portion may be less than the whole of the charge air cooler. The first portion of the charge air cooler tank may be a superset of the second portion. It follows that the second portion may be a subset of the first portion.

The charge air cooler tank may be a charge air cooler inlet tank 232 having a substantially trapezoidal shape with a relatively small inlet side 252 and a relatively large outlet side 253. The outlet side 253 may have a substantially rectilinear perimeter edge configured for sealing engagement with edges of a substantially rectilinear side face of the charge air cooler 200. The valving element 224 may including a plate 234 coupled to the inlet tank at the outlet side 253 for hinge-able movement from the first position wherein the plate is angled into a volume defined by an outside wall 255 of the charge air cooler inlet tank 232 to the second position, wherein the plate is against the side face of the charge air cooler.

Returning to FIG. 4, the valving element 424 may include a plate hinge-ably coupled with the second side of the charge air cooler tank. When in the first position the plate 434 may form an angle greater than 0 deg with a side face of the charge air cooler thereby allowing air to pass into ends of heat transfer tubes of the charge air cooler. When in the second position the plate may be flush with the ends of heat transfer tubes of the charge air cooler thereby significantly preventing air from passing into the ends of the heat transfer tubes. In some examples the angle may be approximately 7 deg.

As seen in FIG. 5, in some examples the plate 434 may include a surface topography 502 which may be configured to fit snugly against the ends of the heat transfer tubes. Some examples may include a bias 494 configured to bias the plate hinge-ably toward either the first position or the second position.

Various embodiments may provide a charge air cooler arrangement for an engine. The charge air cooler arrangement may include a first working remaining volume, a second non-zero working sub-volume, and a valve element configured to enable a charge air cooler to selectively use either the first working volume or the second working volume to cool charge air.

The valve element may be located in one or both of an inlet tank, and an exit tank. The valve element may include a bias to bias a plate to a first position wherein the first working volume may be usable by the charge air cooler. A predetermined pressure condition within the charge air cooler arrangement may tend to hold the plate in a second position wherein the second working volume may be usable by the charge air cooler.

The inlet tank may be coupled with the charge air cooler, and the predetermined pressure condition may be a pressure differential between a first pressure on a first side of the plate caused by an inlet air, and a second pressure caused by a static pressure on a second side of the plate resulting from a fluidic communication with an outlet side of the charge air cooler. The predetermined pressure differential may be for example 4 kPA or may be between approximately 2 kPA and 6 kP.

The valve element may be actuated when one or more predetermined conditions are met selected from a set of conditions that may include ambient air temperature, engine temperature, charge air pressure, charge air density, ambient air humidity, and engine speed.

With some embodiments, one of the working volumes may be a bypass wherein inlet air may be passed from an inlet side to an outlet side where little to no thermal transfer from the inlet air takes place, for example because the bypass does not interact with, and is thermally separated and spaced away from, a cooling fluid, such as cooling air and/or coolant. Some embodiments may include a charge air cooler having a plurality of tubes to pass inlet air from an inlet side to an outlet side. At least one of the plurality of tubes may be a bypass tube wherein substantially no thermal transfer take place. The valve element may be configured to selectively pass inlet air through the bypass tube. The bypass tube, or tubes, may be one of the first or second working volumes, or may be a third portion of the charge air cooler arrangement.

With some embodiments the first working volume may include a different thermal transfer efficiency than the second working volume. The thermal transfer efficiencies may differ in one or more ways, for example, they may differ in fin density, inclusion of turbulators, number of turbulators, flow rate, fin size, fin length, number of fins, fluid path length, and the like.

Figure 10:
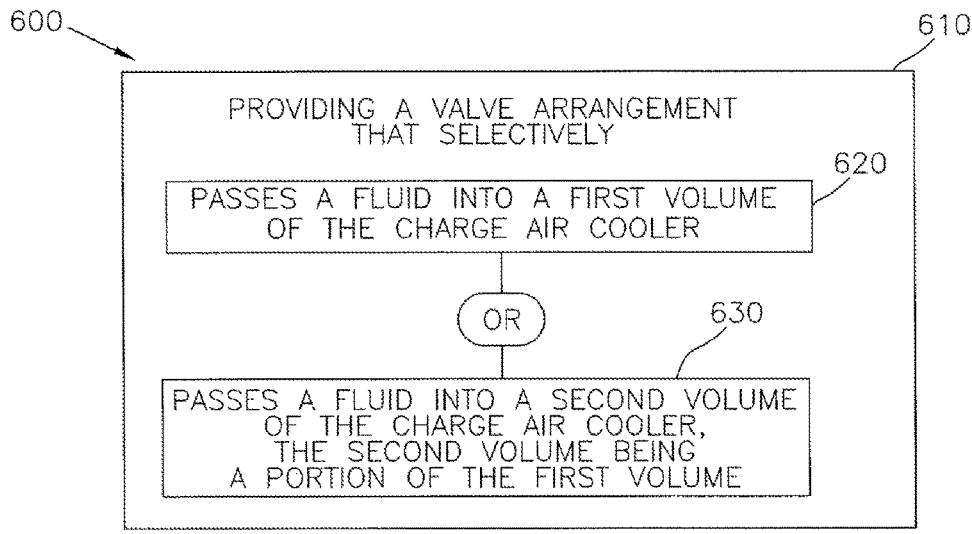
FIG. 10 is a flow diagram illustrating an example method of operating a charge air cooler of an engine in accordance with the present disclosure.

FIG. 10 is a flow diagram illustrating an example method of operating a charge air cooler of an engine in accordance with the present disclosure. The method 600 may include, at 610, providing a valve arrangement that selectively does one or the other of, at 620, pass a fluid into a first volume of the charge air cooler; and at 630, pass a fluid into a second volume of the charge air cooler, the second volume being a portion of the first volume.

Figure 11:
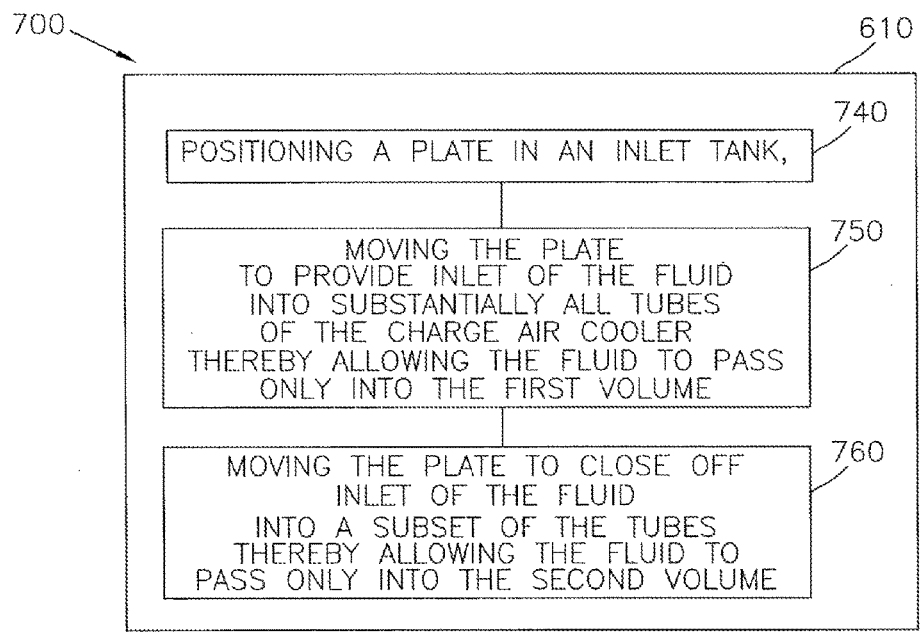
FIG. 11 is a flow diagram illustrating an example modification of the method illustrated in FIG. 10.

FIG. 11 is a flow diagram illustrating a modification of the method 610 illustrated in FIG. 6. The providing a valve arrangement 610, may include, at 740, positioning a plate in an inlet tank. The modified method 700 may include, at 750, moving the plate to provide inlet of the fluid into substantially all tubes of the charge air cooler thereby allowing the fluid to pass only into the first volume; and, at 760, moving the plate to close off inlet of the fluid into a subset of the tubes thereby allowing the fluid to pass only into the second volume.

Figure 12:
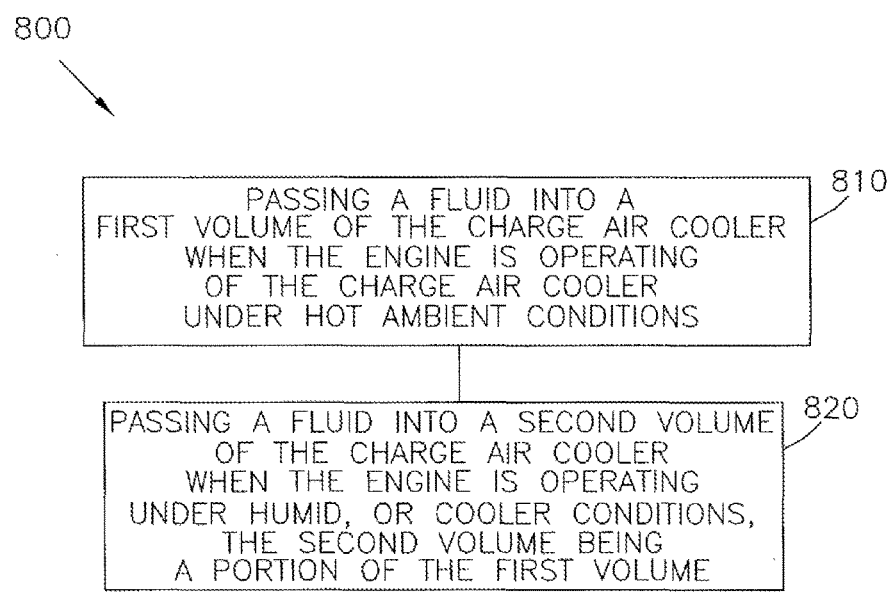
FIG. 12 is a flow diagram illustrating another example method of operating a charge air cooler of an engine in accordance with the present disclosure.

FIG. 12 is a flow diagram illustrating another example method of operating a charge air cooler of an engine in accordance with the present disclosure. The method 800 may include, at 810, passing a fluid into a first volume of the charge air cooler when the engine is operating under hot ambient conditions; and at 820, passing a fluid into a second volume of the charge air cooler when the engine is operating under humid, or cooler conditions, the second volume may be a portion of the first volume.

It will be understood that the depicted engine 10 in FIG. 1 is shown only for the purpose of example, and that the systems and methods described herein may be implemented in or applied to any other suitable engine having any suitable components and/or arrangement of components.

The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A charge air cooler tank, comprising:
    a first side being fluidically coupled to a fluid line;
    a second side being fluidically coupled to a charge air cooler; and
    a flat valving element having:
        a first position configured to allow a fluid to pass through a first portion of the charge air cooler; and
        a second position configured to allow the fluid to pass through a second portion of the charge air cooler, wherein the first portion is larger than the second portion,
    wherein the flat valving element includes a plate hingeably coupled with the second side of the charge air cooler tank,
    wherein, in the first position, the plate forms an angle greater than 0 degrees with a side face of the charge air cooler thereby allowing air to pass into ends of heat transfer tubes of the charge air cooler, and
    wherein, in the second position, the plate is flush with the ends of the heat transfer tubes of the charge air cooler thereby significantly preventing air to pass into the ends of the heat transfer tubes, and further comprising a bias configured to bias the plate hingeably toward either the first position or the second position.

2. The charge air cooler tank of claim 1, wherein the fluid is an intake air, and wherein the flat valving element includes:
    a divider fixed inside the charge air cooler tank dividing the charge air cooler tank into said first portion and said second portion, the fluid line configured to pass the intake air into the first portion;
    a hole in the divider;
    a flap hingeably connected with the divider,
    wherein the flat valving element is in the first position when a majority of the flap is not in contact with the divider such that the hole is open, and
    wherein the flat valving element is in the second position when a majority of the flap is in contact with the divider such that the hole is closed;
    the hole being sized to expose a first area of a first side of the flap such that a mathematical product of the first area and a first fluid pressure exerted on the first area when the hole is closed by the flap yields an opening force on the flap, a second side of the flap having a second area such that a mathematical product of the second area and a second fluid pressure exerted on the second area yields a closing force on the flap, wherein the closing force is greater than the opening force; and
    an actuator configured to move the flap from the first position to the second position.

3. The charge air cooler tank of claim 1, wherein the first portion is essentially a whole of the charge air cooler, and the second portion is less than the whole of the charge air cooler.

4. The charge air cooler tank of claim 1, wherein the plate includes a surface topography configured to fit snugly against the ends of the heat transfer tubes.

5. A charge air cooler tank, comprising:
    a first side being fluidically coupled to a fluid line;
    a second side being fluidically coupled to a charge air cooler; and
    a flat valving element having:
        a first position configured to allow a fluid to pass through a first portion of the charge air cooler; and
        a second position configured to allow the fluid to pass through a second portion of the charge air cooler, wherein the first portion is larger than the second portion, wherein the charge air cooler tank is a charge air cooler inlet tank having a substantially trapezoidal shape with a relatively small inlet side and a relatively large outlet side, the outlet side having a substantially rectilinear perimeter edge configured for sealing engagement with edges of a substantially rectilinear side face of the charge air cooler, the flat valving element including a plate coupled to the charge air cooler inlet tank at the outlet side for hingeable movement from the first position wherein the plate is angled into a volume defined by an outside wall of the charge air cooler inlet tank to the second position, wherein the plate is against the side face of the charge air cooler.

6. A charge air cooler arrangement, comprising:
a charge air cooler having an operable thermal transfer area configured to transfer heat from inside the charge air cooler to outside of the charge air cooler; and
a valve configured to change the operable thermal transfer area from a relatively large area to a relatively small area, the valve including a closure member positionable in each of a first position spaced from a seat member, and a second position adjacent to the seat member where an exposed area of a first valve surface is larger than an exposed area of a second valve surface opposite the first valve surface, wherein the seat member includes a substantially flat stationary member having a hole therethrough, wherein, in the first position, the valve is spaced from the seat member thereby opening a hole, and wherein intake air is able to flow into the relatively large area,
wherein, in the second position, the valve is adjacent to the seat member thereby closing the hole, and wherein the intake air is able to flow into only the relatively small area.

7. The charge air cooler arrangement of claim 6, further comprising:
a plurality of cooling tubes located in the charge air cooler, substantially all of the plurality of cooling tubes defining the relatively large area, a portion of the plurality of cooling tubes defining the relatively small area;
an inlet tank disposed between an intake passage and the charge air cooler providing fluidic access of intake air to the plurality of cooling tubes; and
the valve being located in the inlet tank.

8. The charge air cooler arrangement of claim 6, wherein the valve is a plate pivotally coupled with a charge air cooler inlet tank for selectively obstructing flow into a portion of the charge air cooler to change the operable thermal transfer area to the relatively small area.

9. The charge air cooler arrangement of claim 6, wherein the relatively small area is an area in a first set of tubes accessible from a first set of tube openings; and wherein the relatively large area is a combination of the area in the first set of tubes and an area in a second set of tubes accessible from a respective second set of tube openings.

10. The charge air cooler arrangement of claim 6, wherein the charge air cooler includes a plurality of tubes extending from an inlet side to an outlet side, substantially all of the plurality of tubes being in mutual fluidic communication at the outlet side,
a divider dividing the inlet side of the plurality of tubes into a first set of tubes in mutual fluidic communication on a first side of the divider, and a second set of tubes in mutual fluidic communication on a second side of the divider;
a hole in the divider to allow inlet air to pass through the divider; and
a flap configured to move away from the hole to allow the inlet air to pass through the hole and to move toward sealing engagement with the hole to prevent the inlet air from passing through the hole.

11. The charge air cooler arrangement of claim 10, further comprising an actuator to open and close the flap, the actuator being one or more of an electronic actuator, a vacuum controlled actuator, a mechanical pressure diaphragm, and a pulse-width modulated electronic control.

12. The charge air cooler arrangement of claim 6, further comprising a charge air cooler tank sealed for fluidic communication with a side of the charge air cooler, and wherein the valve includes a plate hingeably positioned at a junction between the charge air cooler tank and the side of the charge air cooler.

13. The charge air cooler arrangement of claim 12, wherein the plate is pivotably coupled with the charge air cooler tank with a shaft, and further comprising one or more torsional springs coupled with the shaft for biasing the plate toward the charge air cooler.

14. The charge air cooler arrangement of claim 12, wherein the plate is pivotably coupled with the charge air cooler tank at a proximal end, and further comprising a bias at a distal end of the plate configured to bias movement of the plate.

15. A charge air cooler arrangement, comprising:
a charge air cooler having an operable thermal transfer area configured to transfer heat from inside the charge air cooler to outside of the charge air cooler;
a valve configured to change the operable thermal transfer area from a relatively large area to a relatively small area, the valve including a closure member positionable in each of a first position spaced from a seat member, and a second position adjacent to the seat member where an exposed area of a first valve surface is larger than an exposed area of a second valve surface opposite the first valve surface;
an inlet tank coupled to an inlet side of the charge air cooler;
a divider separating the inlet tank into two portions; and
the valve located at the divider and configured to open to allow a flow of intake air into the relatively large area and configured to close to allow the flow of intake air into only the relatively small area.

* * * * *